United States Patent [19]
Hwang

[11] Patent Number: 6,166,683
[45] Date of Patent: Dec. 26, 2000

[54] SYSTEM AND METHOD FOR HIGH-INTEGRITY DETECTION AND CORRECTION OF CYCLE SLIP IN A CARRIER PHASE-RELATED SYSTEM

[75] Inventor: Patrick Y. Hwang, Marion, Iowa

[73] Assignee: Rockwell International Corporation, Milwaukee, Wis.

[21] Appl. No.: 09/026,545

[22] Filed: Feb. 19, 1998

[51] Int. Cl.[7] .................................................. G01S 5/02
[52] U.S. Cl. ............................... 342/357.04; 342/357.11
[58] Field of Search ..................... 342/357.06, 357.04, 342/357.11, 357.03, 357.12; 701/213

[56] References Cited

U.S. PATENT DOCUMENTS

| | | | |
|---|---|---|---|
| 4,809,005 | 2/1989 | Counselmann, III | 342/352 |
| 4,894,662 | 1/1990 | Counselmann | 342/357 |
| 5,185,610 | 2/1993 | Ward et al. | 342/357 |
| 5,268,695 | 12/1993 | Dentinger et al. | 342/357 |
| 5,451,963 | 9/1995 | Lempicke | 342/357 |
| 5,471,218 | 11/1995 | Talbot et al. | 342/357 |
| 5,502,641 | 3/1996 | Isomura | 364/449 |
| 5,534,875 | 7/1996 | Diefes et al. | 342/357 |
| 5,548,293 | 8/1996 | Cohen | 342/357 |
| 5,570,097 | 10/1996 | Aguado | 342/357 |
| 5,610,614 | 3/1997 | Talbot et al. | 342/352 |
| 5,623,244 | 4/1997 | Cooper | 340/425.5 |
| 5,648,901 | 7/1997 | Gudat et al. | 364/424.027 |
| 5,748,145 | 5/1998 | Talbot et al. | 342/357 |
| 5,841,399 | 11/1998 | Yu | 342/357 |

OTHER PUBLICATIONS

Pervan et al. "Parity Space Methods for Autonomous Fault Detection and Exclusion Using GPS Carrier Phase" IEEE 1996 Position Location and Navigation Symposium, Apr. 22–24, 1996.

Brown "A Baseline GPS RAIM Scheme and a Note on the Equivalence of Three RAIM Methods," Navigation, vol. 39, No. 3 Fall 1992.

Farrell "The Global Positioning System and Inertial Navigation," McGraw–Hill, 1998.

"IGADD INS–GPS Attitude Determination Demo", Space Systems, Honeywell.

"Investigation And Comparison Of Horizontal Protection Level And Horizontal Uncertainty Level In FDE Algorithms", Dr. R. Young, Dr. G. McGraw, Brian T. Driscoll, pp. 1607–1614.

"A Partial Identification RAIM Algorithm For GPS Sole Means Navigation", R. G. Brown, J. Kraemer, G. Nim, pp. 557–566.

*Primary Examiner*—Gregory C. Issing
*Attorney, Agent, or Firm*—Kyle Eppele; James P. O'Shaughnessy

[57] ABSTRACT

A system and method of detecting and correcting for cycle slip in a GPS attitude determination system is presented. The method employs several techniques for detecting and correcting for faults in high integrity carrier phase-related applications. A delta single difference is used as a primary measurement residual in detecting cycle slip. The delta single difference represents the difference in phase of a carrier signal of a GPS satellite at two receiving antennas over two points in time. This delta single difference is compared to a detection failure threshold computed based on certain high integrity needs. Satellites showing a failure are excluded. In addition, satellites that fail a detectability test, indicating the inability to detect a fault, are pre-excluded from attitude solution computation. When re-resolving integer ambiguities associated with fault detection and correction, the method ensures that the integer ambiguity is resolvable via a resolvability algorithm before implementing a solution-based integer ambiguity resolution.

9 Claims, 7 Drawing Sheets

SYSTEM AND METHOD FOR HIGH-INTEGRITY DETECTION AND CORRECTION OF CYCLE SLIP IN A CARRIER PHASE-RELATED SYSTEM

FIELD OF THE INVENTION

The invention relates generally to carrier phase-related systems. More particularly, the present application relates to a system for and methods of improving information integrity by detecting and correcting cycle slip in carrier phase-related systems.

BACKGROUND OF THE INVENTION

Carrier phase-related systems include systems that compute useful information by receiving a signal at two different locations. The signal generally includes data encoded on a carrier. In certain applications, the phase of the carrier of the received signal is measured at each location and the difference in phase is used to determine positioning characteristics. Carrier phase-related systems include applications in kinematic positioning and carrier-smoothed code differential positioning. In one positioning application, carrier phase-related systems are used in conjunction with a GNSS (Global Navigational Satellite System) such as Global Positioning System (GPS)/Navstar or GLONASS for altitude determination of a vehicle.

Figure 1:
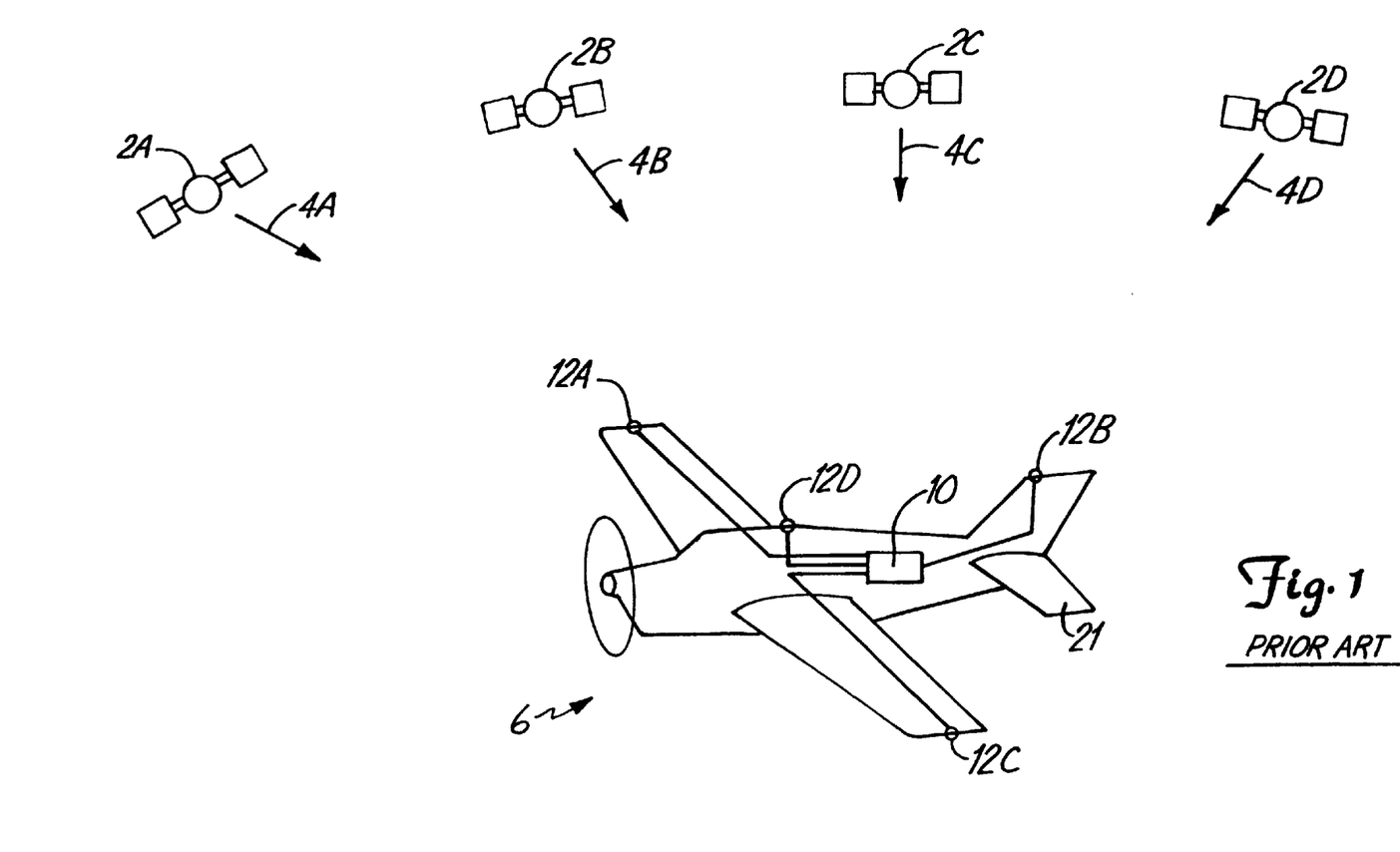
FIG. 1 is a schematic illustration of a conventional GPS attitude determination system.

GPS is a navigational system used by military and civilian naval, ground and airborne vehicles. GPS includes 24 Navstar satellites (SVs) deployed in 12-hour orbits about Earth and dispersed in six orbital planes at an altitude of 11,200 miles. The satellites continuously emit electronic GPS signals (or telemetry) for reception by naval, ground and airborne receiver units (FIG. 1). By receiving GPS signals from four or more satellites, a properly configured receiver unit can accurately determine its position in three dimensions and time.

Figure 2:
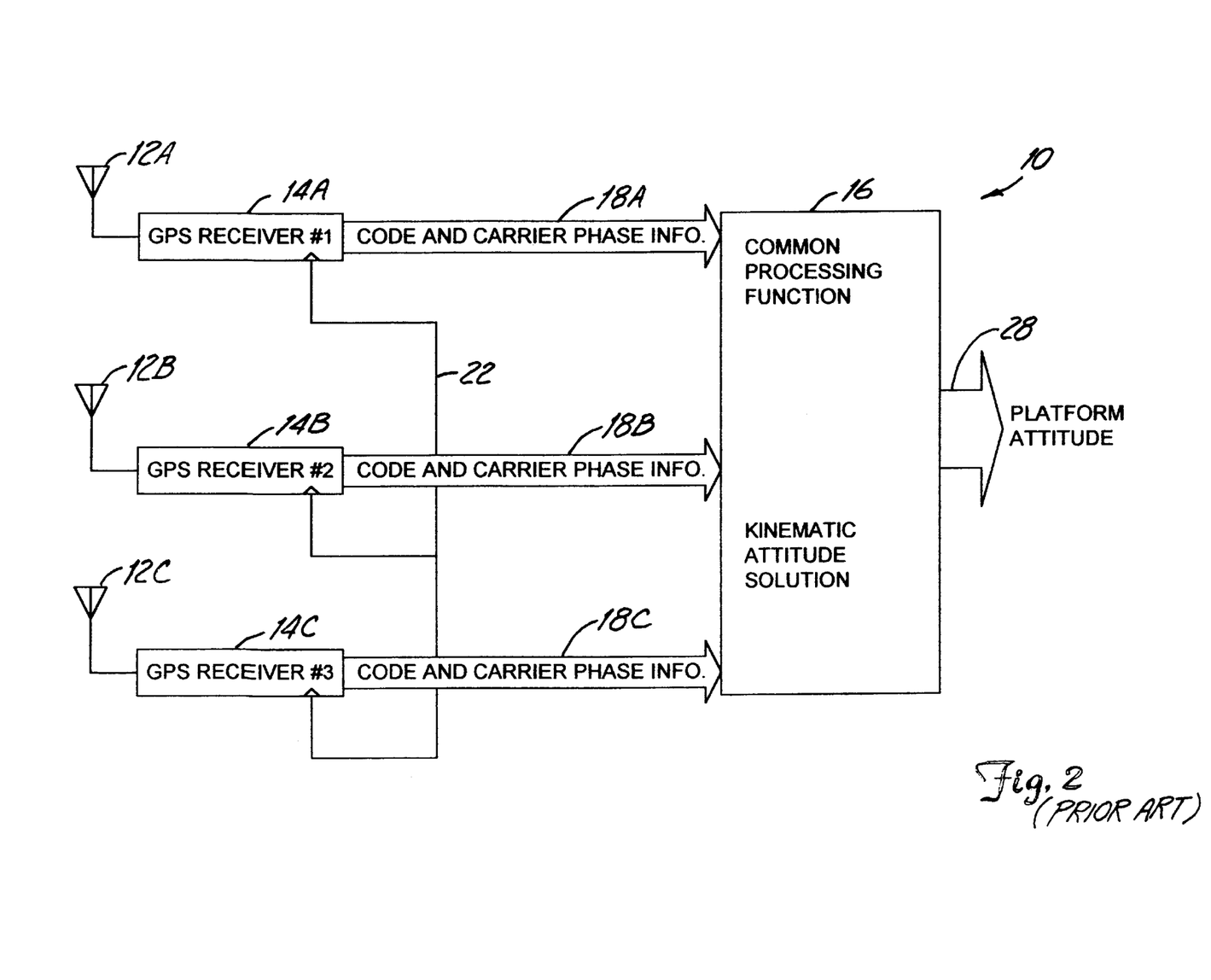
FIG. 2 is a general block diagram of the attitude determination system illustrated in FIG. 1.

The maturation of multi-antenna GPS technology for attitude determination (including heading) has motivated investigations into its use both as a viable supplement to inertial gyro sensors in the near term, and possibly as an essential complement to them in the long term. Conventional GPS navigational systems capable of attitude determination, such as system 6 illustrated in FIGS. 1 and 2, generally include at least three antennas 12A–C coupled to at least three GPS receiving units 14A–C and a processor 16. Receiving units 14A–C "track" the GPS satellites, i.e. determine carrier phase information from the satellites. Computer 10 then determines a coordinate position for the vehicle 21 upon which it is implemented based upon satellite signal code and carrier phase information received on buses 18A–C from receivers 14A–C. Additionally, processor 16 compares satellite signal code and carrier phase information to compute attitude information at an output 28 for system 6. The calculation of the attitude information from the carrier phase information on buses 18A–C is well known in the art. Briefly, attitude determination involves measuring and analyzing integrated carrier phases from tracking a plurality of satellites to obtain three-dimensional coordinate values of an unknown point with high accuracy.

Figure 3:
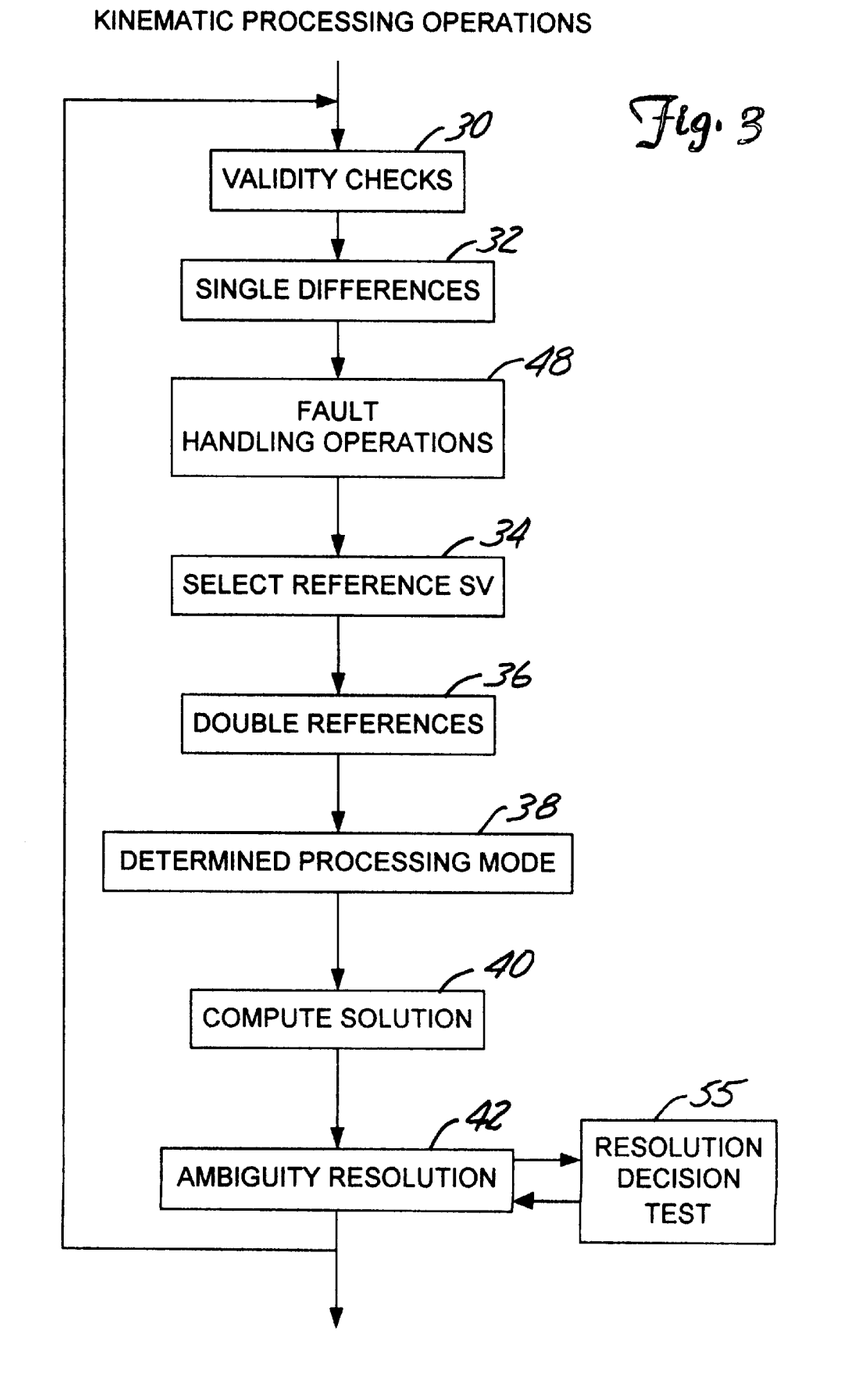
FIG. 3 is a flowchart showing standard kinematic processing operations.

With reference to FIG. 3, there is shown a conventional kinematic processing method for attitude determination operations. The kinematic processing begin with validity checks at a step 30 whereby individual carrier and phase information from satellites 2A–D (FIG. 1) is checked. Signal-to-noise ratio, loss of lock and phase error threshold are calculated based on signal parameters to ensure the quality of each incoming signal. Next, a single differencing is done at a step 32. Single differencing refers to taking the difference in the phases of the carrier waves between two GPS signals along an antenna baseline. Single differencing removes satellite clock errors, atmospheric refraction errors, some level of multipath errors and errors caused by selective availability.

The next step is selection of a reference GPS signal at a step 34. Once one signal has been selected as the reference, a double differencing is done at a step 36. In double differencing, the single differenced results are differenced again between satellites. Double differencing removes receiver clock errors, electrical path length errors, and non-synchronous receiver errors. Next, the processing mode is determined at a step 38. The processing mode may be either "initializing" or "tracking". The mode will be "initializing" if initial integer ambiguities associated with each satellite have not been resolved on enough satellites to achieve a sufficiently precise solution computation. Conversely, the mode will be "tracking" if sufficient integer ambiguities have been resolved.

Next, an attitude solution is computed at a step 40 using well-known methods. Finally, ambiguity resolution at a step 42 occurs for any satellite signals not yet initialized; and the system 6 begins again with validity checks 30.

In attitude determination, one problem well-known in the art results from signals transmitted from the GPS satellites being subjected to various kinds of obstacles including body obscuration, body multipath, external multipath and interference, all well-known in the art. These obstacles sometimes cause an interruption, either instantly or continuously, on the receiving end 14A–C of the system 6. Until the obstacles are removed, the radio waves to be transmitted from the GPS satellites cannot be received. Consequently, the amount of changes of the integrated carrier phase during this interruption cannot be known. This kind of dropping or lacking of measured data due to receiving obstacles is called the "cycle slip" or "fault" or "failure" and is regarded to be the most insidious type of error in a GPS attitude determination system. The high fidelity information derived from carrier phase measurements rely greatly on the fact that the carrier phase is continuously and flawlessly tracked without cycle slip.

Another problem well-known in the art is that of ambiguity resolution. GPS interferometric techniques involve ambiguity in the solution space for the carrier phase measurements, which must be resolved. Specifically, the carrier phase measurement repeats every wavelength of the GPS carrier frequency, which is about 19 centimeters. Thus, the actual path difference for a first and second antenna to a selected satellite is the distance corresponding to the measured phase difference plus an unknown integer number of wavelengths. As a result, a number of path-difference solutions exist within the uncertainty region, creating an ambiguity problem at every integer wavelength that must be resolved before that satellite can be used in attitude solution computations.

Several techniques have been used to detect and/or correct for cycle slip errors. For example, errors due to body obscuration have been addressed by body profile masking, either physical or through software implementation as disclosed in U.S. Pat. No. 5,185,610 to Ward, et. al. However, masking limits available satellites and fails to address the other above-mentioned sources of cycle slip errors.

Another technique is directed to a GPS surveying system that, upon detection of a cycle slip, calculates; a correction amount and adds it back into the integrated carrier phase. However, this technique is not appropriate for a moving vehicle which does not have a constant position over time. Once movement is introduced into this system, additional uncertainties and noise result making its results difficult to achieve.

Another technique is a method for generating attitude determinations including integrity checking. This integrity checking takes advantage of the known relationship among four antennas in a plane to detect a cycle clip. Thus, the method is limited to a four-antenna system, which is not always available, particularly on an airplane where space for antennas is limited. Further, this method lacks the robustness needed for a high-integrity environment.

Many techniques are known in the art for resolving ambiguities. However, these solutions are directed to resolving ambiguities in an initialization stage, usually while an aircraft is stationary. The solution-based ambiguity resolution and resolvability test of the present invention is optimal for re-resolution of ambiguities that were lost during tracking as a result of a cycle slip or a newly visible satellite.

Thus, there is a need for an improved system for and method of detecting and correcting cycle clip in a carrier phase-related system that overcomes the above-mentioned deficiencies. Further, there is a need for a cycle slip detection and correction system which is applicable to systems with less than four antennas, such as in simple, two-antenna pointing applications. Further still, there is a need for a cycle slip detection and correction system which can correct for resulting ambiguities while tracking, and has the robustness needed for high-integrity applications.

SUMMARY OF THE INVENTION

The present invention relates to a carrier phase-related system having several satellites and having first and second antennas. The method of the present invention, according to one exemplary embodiment, is directed to a cross-consistency check among satellites that receives the signals in the antennas and measures the phases of the carriers of the signals at successive processing epochs. From these measurements, single differences are calculated and a delta single difference is calculated. The delta single difference is compared to a failure threshold calculated for high integrity applications and the existence of a fault is determined thereby.

According to another (exemplary aspect of the present invention, a carrier phase-related system is presented having first and second antennas, each antenna receiving a plurality of carrier signals from a plurality of satellites. The method according to this exemplary embodiment includes testing the detectability of the satellites by establishing a failure threshold for high integrity applications, establishing a test statistic, comparing the test statistic to the threshold to determine detectability and tagging each non-detectable satellite for pre-exclusion.

According to another exemplary aspect of the present invention, a carrier phase-related system is presented having first and second antennas, each receiving a plurality of carrier signals from several satellites. In this embodiment, the satellites have unresolved integer ambiguities associated therewith and three of said satellites have their integer ambiguities resolved. The method according to this exemplary embodiment includes testing the resolvability of an unresolved integer ambiguity by calculating a test statistic, establishing a minimum integrity requirement, establishing a validity threshold based on said minimum integrity requirement, comparing the test statistic to the validity threshold and declaring the unresolved integer ambiguity resolvable based on the comparison.

According to another aspect of the present invention, a carrier phase-related system is presented having several satellites. The system includes means for establishing detectability criteria, means for testing the detectability of the satellites using the detectability criteria and means for tagging non-detectable satellites for pre-exclusion.

According to another aspect of the present invention, an isolated cycle slip is paired up with the appropriate satellite for exclusion from computations of attitude.

According to another aspect of the present invention, a satellite is tagged for post-exclusion only if it is found to have a cycle slip. If it is found to not have a cycle slip, all satellites are tagged for post-exclusion.

According to another aspect of the present invention, all satellites tagged for either pre-exclusion or post-exclusion are reported.

BRIEF DESCRIPTION OF THE DRAWINGS

The preferred exemplary embodiment of the invention will hereinafter be described in conjunction with the appended FIGURES, in which like reference numerals denote like elements and.

DETAILED DESCRIPTION OF A PREFERRED EMBODIMENT

Figure 4:
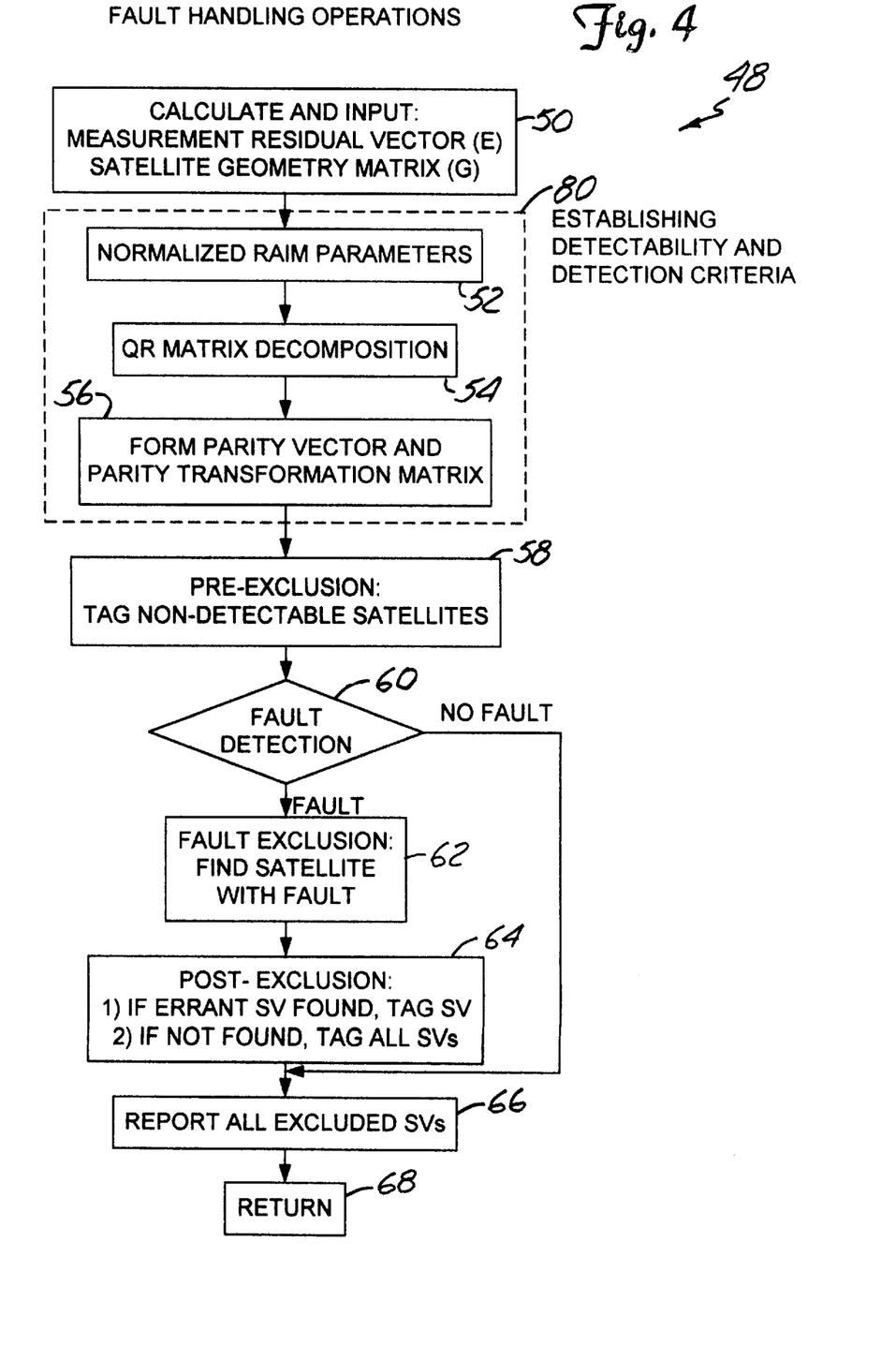
FIG. 4 is a flowchart of the fault handling operations according to an exemplary embodiment of the present invention.

With reference now to FIG. 4, new fault handling operations can be inserted at a variety of points in the kinematic processing operations of FIG. 3. One choice is for insertion after where the single difference computations are made at a step 32. These new fault handling operations are drawn from a monitoring method known as Receiver Autonomous Integrity Monitoring (hereinafter "RAIM"). RAIM is a method of integrity monitoring of position in civil aviation. The combined system of kinematic processing and new fault handling operations will be referred to herein as Kinematic RAIM (hereinafter "KRAIM"). KRAIM is an adapted form of RAIM that acts as a final check for errors that the kinematic processing functions might have missed.

At a step 50, the kinematic processing operations of FIG. 3 pass a measurement residual vector M and a satellite geometry matrix (G) to the fault handling operations 48. The measurement-solution relationship for the kinematic processing operations can be stated as follows:

$$y = Gx + b + \epsilon \tag{1}$$

where y is a pseudorange measurement residual vector, G is the satellite geometry matrix, x is a state error vector, b is a bias vector and $\epsilon$ is a measurement residual vector. Equation (1) is a matrix generalization of Equation (2) below.

$$\begin{bmatrix} \alpha_1 \\ \alpha_2 \\ \vdots \\ \alpha_n \end{bmatrix} = \begin{bmatrix} h_x^{(1)} & h_y^{(1)} & h_z^{(1)} & 1 \\ h_x^{(2)} & h_y^{(2)} & h_z^{(2)} & 1 \\ \vdots & & & \vdots \\ h_x^{(n)} & h_y^{(n)} & h_z^{(n)} & 1 \end{bmatrix} \begin{bmatrix} \Delta x \\ \Delta y \\ \Delta z \\ \Delta t \end{bmatrix} \quad (2)$$

In Equation (2), y is represented by an nx1 vector (where n represents the number of satellites in view) whose variables represent the differences between noisy measured pseudoranges and predicted ones based on a nominal position and clock bias. The satellite geometry matrix (G) is a vector containing information regarding where satellites are. The G matrix is composed of unit vectors pointing from the satellites based on known satellite location and which satellites are involved in the computation. The G matrix is also a linear connection matrix between x and y consisting of those unit vectors and a fourth column of 1s corresponding to the receiver clock rate. The state error vector (x) is either a 3x1 or a 4x1 vector whose elements are incremental deviations from the nominal state about which linearization takes place. The first 3 elements are east, north and up aircraft position error components, and the fourth element, if present, is the aircraft receiver clock bias error. These errors are errors with respect to nominal aircraft position and nominal clock bias.

The forms of the G matrix and the solution vector x depend on the problem we are solving. The present invention embodies two forms, one involving the standard three position variables and one time variable (position-time model), that requires a minimum of 4 satellites. The second form involves solving only for the three position variables (position-only model) if the receivers in the multi-antenna configuration are nearly synchronized and have the same clock drift rate. The latter can be achieved by running the multiple receivers off the same reference oscillator such as at 22 in FIG. 2. The position-only model requires a minimum of 3 satellites. Below are the models of Equation (1) in an ideal environment, i.e., assuming no noise.

Position-time model: (3)

$$\begin{bmatrix} \alpha_1 \\ \alpha_2 \\ \vdots \\ \alpha_n \end{bmatrix} = \begin{bmatrix} h_x^{(1)} & h_y^{(1)} & h_z^{(1)} & 1 \\ h_x^{(2)} & h_y^{(2)} & h_z^{(2)} & 1 \\ \vdots & & & \vdots \\ h_x^{(n)} & h_y^{(n)} & h_z^{(n)} & 1 \end{bmatrix} \begin{bmatrix} \Delta x \\ \Delta y \\ \Delta z \\ \Delta t \end{bmatrix}$$

Position-only model:

$$\begin{bmatrix} \alpha_1 \\ \alpha_2 \\ \vdots \\ \alpha_n \end{bmatrix} = \begin{bmatrix} h_x^{(1)} & h_y^{(1)} & h_z^{(1)} \\ h_x^{(2)} & h_y^{(2)} & h_z^{(2)} \\ \vdots & & \\ h_x^{(n)} & h_y^{(n)} & h_z^{(n)} \end{bmatrix} \begin{bmatrix} \Delta x \\ \Delta y \\ \Delta z \end{bmatrix}$$

If multiple receivers have perfectly synchronized clocks, the position-only method can be used. If the clocks are not perfectly synchronized, the position-time method must be used. Both methods are contemplated in the present invention and, thus, differences will be noted only where necessary. In the position-only model with three solution states $[\Delta x \Delta y \Delta z]^T$, there will be one more degree of freedom in the parity computation than for the position-time model for a given visible satellite constellation. This difference is properly accounted for when using the position-only model. Also for the position-only model, the dimensionality of parity vector p is (n-3) instead of (n-4) (see Equation (7) below), and the parity transformation matrix P is (n-3) by n instead of (n-4) by n.

Finally, the measurement residual ($\epsilon$) in Equation (1) is a vector made up of the change in the single difference carrier phase measurements over a single interval between successive processing epochs and is calculated at a step 50. A typical processing epoch is one second. The change in the single difference carrier phase measurement is the delta single difference. This difference eliminates all range and clock dynamics and will only contain differential carrier phase tracking noise and multipath. A single difference measurement combination is made up of:

$$\Delta \Phi_{AB} = \Phi_A - \Phi_B \quad (4)$$

where $\Phi_A$, the carrier phase measured at a first antenna, A, consists of the following components:

$$\Phi_A = r_A^{LOS} + r_A^{clock} + r^{iono} + r^{tropo} + r^{SVclock} + r^{SA} + N_A + \mu_A + \eta_A$$

Similarly for a second antenna, B, $$\Phi_B = r_B^{LOS} + r_B^{clock} + r^{iono} + r^{tropo} + r^{SVclock} + r^{SA} + N_B + \mu_B + \eta_B$$

The "r"s represent range equivalents of errors where $r^{LOS}$ is the range equivalent of the physical distance from the satellite to the receiving antenna (Line of Sight), $r^{clock}$ is the range equivalent of timing error that exists in the receiver clock, $r^{iono}$ is the range equivalent of error attributable to the signal being slowed down or sped up as it travels through the ionosphere, $r^{tropo}$ is the range equivalent of error attributable to the signal being slowed down as it travels through the troposphere, and $r^{SVclock}$ is the range equivalent of satellite timing error, and $r^{SA}$ is due to the range equivalent of selective availability. N is the integer number of carrier phase cycles in the signal. It is integer in nature if its units are in cycles or wavelengths, otherwise it can be in meters. $\mu$ and $\eta$ represent error at the tracking end of the receiver, in the case of $\mu$, due to multipath and, in the case of $\eta$, due to high frequency noise. Thus, $$\Delta \Phi_{AB} = (r_A^{LOS} - r_B^{LOS}) + (r_A^{clock} - r_B^{clock}) + (N_A - N_B) + (\mu_A - \mu_B) + (\eta_A - \eta_B),$$

$$\Delta r_{AB}^{LOS} = (r_A^{LOS} - r_B^{LOS})$$

$$\Delta r_{AB}^{clock} = (r_A^{clock} - r_B^{clock})$$

$$\Delta N_{AB} = (N_A - N_B)$$

$$\Delta \mu_{AB} = (\mu_A - \mu_B)$$

$$\Delta \eta_{AB} = (\eta_A - \eta_B) \quad (5)$$

The delta single difference is formed by differencing the current single difference from that made at the last processing epoch:

$$\Delta \Phi_{AB}(t_k) - \Delta \Phi_{AB}(t_{k-1}) = [\Delta r_{AB}^{LOS}(t_k) - \Delta r_{AB}^{LOS}(t_{k-1})] +$$

$$[\Delta r_{AB}^{clock}(t_k) - \Delta r_{AB}^{clock}(t_{k-1})] + [\Delta N_{AB}(t_k) - \Delta N_{AB}(t_{k-1})]$$

$$[\Delta \mu_{AB}(t_k) - \Delta \mu_{AB}(t_{k-1})] + [\Delta 72_{AB}(t_k) - \Delta \eta_{AB}(t_{k-1})]$$

These terms can be grouped as follows:

$$y = \Delta \Phi_{AB}(t_k) - \Delta \Phi_{AB}(t_{k-1})$$

$$a=[\Delta r_{AB}^{LOS}(t_k)-\Delta r_{AB}^{LOS}(t_{k-1})]+[\Delta r_{AB}^{clock}(t_k)-\Delta r_{AB}^{clock}(t_{k-1})]$$

$$b=\Delta N_{AB}(t_k)-\Delta N_{AB}(t_{k-1})$$

$$\epsilon=[\Delta\mu_{AB}(t_k)-\Delta\mu_{AB}(t_{k-1})]+[\Delta\eta_{AB}(t_k)-\Delta\eta_{AB}(t_{k-1})],$$

and $$y=a+b+\epsilon, \text{ where} \quad (6)$$

y represents the same pseudorange measurement residual vector as in Equation (1), $\alpha$ represents range-related terms, b indicates the presence or absence of a cycle slip, and $\epsilon$ represents error due to multipath and high-frequency noise. Note that if no cycle slip occurs, the term $\Delta N_{AB}(t_k)$ is equal to $\Delta N_{AB}(t_{k-1})$, and b is eliminated in the delta single difference. The information in $\alpha$ is consistent across all satellite measurements because it can be related to a common effect x in the solution space through a measurement transformation, that when generalized to a vector equation capturing all satellite measurements, that transformation is contained in the measurement matrix G. The measurement-solution relationship is as follows:

$$y=Gx+\epsilon$$

When a cycle slip does occur on a single satellite, the additional term b represents a fault:

$$y=Gx+b+\epsilon$$

For the position-only model, the time term represented by $$[\Delta r_{AB}^{clock}(t_k)-\Delta r_{AB}^{clock}(t_{k-1})]$$

in Equation (6) is eliminated because $$\Delta r_{AB}^{clock}(t_k)=\Delta r_{AB}^{clock}(t_{k-1})$$

as a consequence of the same clock drift in both receivers.

Note that Equation (5) assumes the iono and tropo components, $r^{iono}$ and $r^{tropo}$, are common between the measurements of the two receivers. But even if they are not common, as long as they remain nearly constant over the interval between successive processing epochs, these effects are eliminated in Equation (6). Although this would seem to suggest that we may not need differential operation to monitor cycle slipping on a single receiver, the SA component, $r^{SA}$, can change significantly over time (nominally one cycle per second), so, therefore, in the presence of $r^{SA}$, it is difficult to monitor cycle slip on a stand-alone basis.

Once measurement residual vector G and satellite geometry matrix G are established at the step 50, the system proceeds to establish detectability and detection criteria at steps 80.

According to one aspect of the present invention, before the actual fault detection computation is done at a step 60, satellites may be checked for detectability at a step 58. Detectability is the ability to detect a fault in a satellite regardless of whether it exists and is dependent in part on the number of available satellites and their combined geometry. If a satellite does not meet a minimum level of detectability it cannot be used in the solution computation of step 40. Although FIG. 4 indicates fault detection 60 coming after pre-exclusion of non-detectable satellite 58, the latter step does not rely on the results of the former. Therefore, the order of steps 60 and 58 can be switched, or the steps could be performed simultaneously.

Detectability and detention criteria include a parity transformation matrix P and a parity vector p. The establishment of these criteria involves several steps which are common to both detection and detectability, and one that is different. The common steps will be covered first.

First, each component of the measurement-solution relationship (see Equation (1)) is divided by a constant factor such that noise levels are normalized using standard normalization techniques at a step 52. Equation (1) can be normalized as $$W^{-1}y=W^{-1}Gx+W^{-1}b+W^{-1}\epsilon$$

where $$W = \begin{bmatrix} \sigma_1 & 0 & \cdots & 0 \\ 0 & \sigma_2 & \cdots & 0 \\ \vdots & \vdots & \ddots & \vdots \\ 0 & 0 & \cdots & \sigma_N \end{bmatrix}$$

and $\sigma_1, \sigma_2, \cdots, \sigma_n$ are the standard deviations for each measurement. For simplicity, the normalized measurement $W^{-1}\epsilon$ residual vector will be referred to hereinafter simply as M though it is to be understood that $\epsilon$ still represents $W^{-1}\epsilon$ throughout.

Next, a QR matrix decomposition is done at a step 54. Using the QR decomposition, we can write G=QR where Q is a N×N matrix, R is a N×4 matrix, $Q^TQ=QQ^T=I$, and R is an upper triangular matrix. We can partition Q as $$Q^T = \begin{bmatrix} Q_x \\ P \end{bmatrix}.$$

where $Q_x$ is a 4×N matrix, P is the parity transformation matrix (described below).

Finally, a parity vector p and a parity transformation matrix P are formed at a step 56. The p vector is formed from the P matrix; however, the p vector for detection is calculated differently than the p vector for detectability. For detection, the method used to calculate the p vector is known as the parity method. A key equation in this method is a linear transformation of the aforementioned vector of measurement residuals ($\epsilon$) to a parity vector:

$$p=P\epsilon \quad (7)$$

where $\epsilon$ is the measurement residual vector, p is the parity vector of dimension (n-4), and P is the parity transformation matrix (n-4×n).

To calculate the p vector for detectability, also at step 56, we rewrite Equation (7) in the partitioned form as follows:

$$p = [P_1 \vdots P_2 \vdots \cdots \vdots P_n] \begin{bmatrix} \varepsilon_1 \\ \varepsilon_2 \\ \vdots \\ \varepsilon_n \end{bmatrix} \quad (8)$$

Each column vector in P, sometimes known as a characteristic vector, may be thought of as representing the parity vector p if there exists a single failure bias and it corresponds to the satellite associated with that column. For example, if a unit bias failure occurs on Satellite #2, the parity vector is then made up of the second column vector. Consequently, the parity vector magnitude is the magnitude of the second column vector.

$$p = [P_1 \vdots P_2 \vdots \cdots \vdots P_n] \begin{bmatrix} 0 \\ 1 \\ \vdots \\ 0 \end{bmatrix} = P_2$$

This characteristic vector $P_2$ becomes a detectability test statistic for the detectability analysis of Satellite #2 below.

With detectability and detection criteria established, the system proceeds at a step 58 to perform the detectability analysis. Whether a particular failure can be detected or not depends on the size of the parity vector magnitude (as computed above) as compared to a detectability threshold. This detectability threshold, known in the art as PBias, varies as a function of the number of satellites and has been numerically derived for the specific requirements laid down for civil aviation assuming a normalized noise environment of one meter standard deviation (see Table 1 below). Those requirements are: (a) false alert rate of 0.002/hr for supplemental nav and 0.00001/hr for sole means nav; (b) miss detection probability of 0.001.

TABLE 1

Normalized PBias Levels

Missed detection rate = 0.001

| Number of SV's | False alert = 6.67 ($10^{-5}$) | False alert = 3.33 ($10^{-7}$) |
|---|---|---|
| 5 | 7.078 | 8.194 |
| 6 | 7.388 | 8.479 |
| 7 | 7.609 | 8.687 |
| 8 | 7.788 | 8.860 |
| 9 | 7.941 | 9.009 |
| 10 | 8.077 | 9.142 |
| 11 | 8.199 | 9.263 |
| 12 | 8.311 | 9.375 |

The test for our example above, say for n=7 and a false alert rate of 6.67 ($10^{-5}$), is simply:

SV#2 is detectable if $|P_2|>7.609\sigma$;
SV#2 is not detectable if $|P_2|<7.609\sigma$.

where $\sigma$ is the standard deviation of the measurement residual noise.

Next, satellites in the visible constellation deemed non-detectable must be dealt with appropriately also at a step 58. It was found, from preliminary satellite constellation simulations, that if the non-detectable satellite (if there is one) is simply excluded in the RAIM and solution processing, there is still a significant likelihood that the new sub-constellation formed may yet contain another non-detectable satellite. This latter satellite became non-detectable in the new sub-constellation even though it might have been detectable in the original constellation. In this particular case, the action of removing the original non-detectable satellite would be a wasteful one. Also, a "key" satellite in a constellation that contributes significantly to the DOP (Dilution Of Precision) is also very likely to have poor detectability. Therefore, instead of eliminating a non-detectable satellite, it would be more prudent to retain it in the detection 60 and exclusion process 62, 64, but to be conservative, we would not use it in the solution computations 40. This type of exclusion will be called "pre-exclusion" and occurs at a step 58.

Next, actual fault detection occurs at a step 60. The RAIM failure detection test generally involves comparing a test statistic, the magnitude of the vector p (computed above), against a failure threshold, $T_d$. If the test statistic exceeds the threshold, a failure is declared. Equivalently, the square of the magnitude may be tested instead. The fault detection threshold is set up according to a false alert rate and varies as a function of the number of satellites used in the computation. According to an exemplary embodiment, the following table indicates RAIM detection thresholds for a specified false alert rate ($Pr_{FA}$):

TABLE 2

RAIM Failure Detection Thresholds for $Pr_{FA}$ = 3.33 + $10^{-7}$

| Number of Satellites in view (n) | Chi-square Degrees of Freedom (DOF) | Normalized Chi-square Threshold (a = $T_D^2$) | Threshold $T_D$ in meters for \|p\| as the test statistic and $\sigma$ = 33 meters |
|---|---|---|---|
| 5 | (Gaussian methods used for n = 5) | | 168.42 |
| 6 | 2 | 29.828 | 180.23 |
| 7 | 3 | 32.929 | 189.37 |
| 8 | 4 | 35.701 | 197.18 |
| 9 | 5 | 38.268 | 204.14 |
| 10 | 6 | 40.690 | 210.50 |
| 11 | 7 | 43.002 | 216.40 |
| 12 | 8 | 45.227 | 221.93 |

The threshold were calculated using MATLAB programs dependent on the number of degree of freedom (DOF) as shown below:

(a) 2 DOF, noncentral chi-square probability density function:

```
function y = ncchisq2(x)
% NCCHISQ2 2 DOF noncentral chi-square probability density function
% N = number of terms in series minus one
% lamb is the noncentral parameter
N = 49
lamb = 71.886
prevterm = 1
dum = 1
for j = 1:N
term = prevterm.*lamb.*x./(4.*j.*j);
dum = dum + term;
prevterm = term;
end
y = .5.*dum.*exp (-.5.*(x + lamb))
```

(b) 3 DOF, noncentral chi-square probability density function:

```
function y = ncchisq3(x)
% NCCHISQ3 3 DOF noncentral chi-square probability density function
% N = number of terms in series minus one
% lamb is the noncentral parameter
N = 49
lamb = 75.472
prevterm = 2/(sqrt(pi))
dum = 2/(sqrt(pi))
for j = 1:N
term = prevterm.*lamb.*x./(4.*j.*(j + .5));
dum = dum + term;
prevterm = term;
end
a = .5/sqrt(2)
y = a.*dum.*(exp(-.5.*(x + lamb))).*sqrt(x)
```

(c) 4 DOF, noncentral chi-square probability density function:

```
function y = ncchisq4(x)
% NCCHISQ4 4 DOF noncentral chi-square probability density function
% N = number of terms in series minus one
% lamb is the noncentral parameter
N = 49
lamb = 78.494
prevterm = 1.0
```

```
                    -continued dum = 1.0
for j = 1:N
  term = prevterm.*lamb.*x./(4.*j.*(j + 1));
  dum = dum + term;
  prevterm = term;
end
a = .25
y = a.*dum.*(exp(-.5.*(x + lamb))).*x
(d) 5 DOF, noncentral chi-square probability density function:

function y = ncchisq5(x)
% NCCHISQ5 5 DOF noncentral chi-square probability density function
% N = number of terms in series minus one
% lamb is the noncentral parameter
N = 49
lamb = 81.163
prevterm = 1/(.75*sqrt(pi))
dum = 1/(.75 *sqrt(pi))
for j = 1:N
  term = prevterm.*lamb.*x./(4.*j.*(1 + 1.5));
  dum = dum + term;
  prevterm = term;
end
a = .25/sqrt(2)
y = a.*dum.*(exp(-.5.*(x + lamb))).*x.*(sqrt(x))
```

If no fault is detected, then the RAIM equations simply return a message to the kinematic processing operations that no fault has occurred in the satellite signals and any pre-excluded satellites are reported at a step 66. However, if a fault is detected, the RAIM functions attempt to find which of the signals has a fault at a step 62. This is called fault exclusion.

The fault exclusion algorithm of step 62 is also based on standard parity methods. Geometrically, the test for the best exclusion candidate of the satellites being tracked involves finding which of the characteristic vectors in P in Equation (8) lines up best with the parity vector p. To allow for the presence of noise in the data, the probability of misidentification of the, correct candidate must be assessed. This is based on the separation between the vector associated with the best candidate and that associated with the next best candidate. If the misidentification probability is below an acceptable threshold, then the best candidate will be identified for exclusion. (Fault exclusion schemes that may conservatively exclude multiple candidates, to ensure including the correct candidate, are also acceptable.) Otherwise, no candidate will be identified by this scheme, in which case the system must then come up with an alternative plan to handle this condition of non-availability. At the present time the most appropriate action is to declare that there are faults in all satellites involved at a step 64. This will likely cause the system operating mode to revert to Initialize, where all the cycle ambiguities must be resolved again.

At a step 64, if the satellite signal with the fault has been found, it is tagged as "post-excluded". However, if a fault has been found but the corresponding satellite cannot be found, all satellites are tagged as post-excluded 64. In both cases, RAIM operations return a message at a step 66 to the kinematic processing operations indicating any post-excluded satellites and pre-excluded satellites for further processing at a step 68.

Whenever one or more satellites are excluded, either when a fault is detected or the exclusion is based on non-detectability, their new (cycle ambiguities must be re-resolved. If there are enough satellite measurements with already resolved ambiguities to form a solution, (i.e., three satellites for the Position-Only model, four the Position-Time Model), the ambiguities of the excluded satellites can be resolved based on that solution. This is called solution-based ambiguity resolution.

The validity of the solution used for ambiguity resolution requires not only that there are enough satellite measurements to form the solution but also that the geometry of satellites with resolved ambiguities produces a sufficiently accurate solution. If the geometry cannot produce a sufficiently accurate solution, the integer ambiguity is unresolvable. The test for this is called resolvability and is explained next.

The relationship between the single difference measurement of an excluded satellite, $\Delta\Phi$ and the state error vector x is given by:

$$\Delta\Phi^{(i)} = [h_x^{(i)} h_y^{(i)} h_z^{(i)} 1] \begin{bmatrix} \Delta x \\ \Delta y \\ \Delta z \\ \Delta t \end{bmatrix} + N^{(i)} + \varepsilon^{(i)} \quad (9)$$

where $g^{(i)} = [h_x^{(i)} h_y^{(i)} h_z^{(i)} 1]$, $$x = \begin{bmatrix} \Delta x \\ \Delta y \\ \Delta z \\ \Delta t \end{bmatrix},$$

and $N_{(i)}$ represents the unresolved integer ambiguity.

In reality, the kinematic solution does not have observability into the clock term, $\Delta t$. The main reason for this is that there is no way for the system to separate $\Delta t$ from $N^{(i)}$. By differencing the single differences across satellites, a double difference is produced that eliminates $\Delta t$, leaving the solution to only consist of the position states. However, for clarity of notation, we shall retain the single difference form in our derivations here. To do so, simply regard the $\Delta t$ in Equation (9) as a known but arbitrary value that is the same also for all the other satellites involved. Then, we can resolve the ambiguity $N^{(i)}$ by $$N^{(i)} = \Delta\Phi^{(i)} - g^{(i)}x - \varepsilon^{(i)} \quad (10)$$

To test resolvability, we must first calculate a resolvability test statistic:

$$t = \Delta\Phi^{(i)} - g^{(i)}x$$

This t can be rounded to the nearest integer value by, $$N_t = \text{Round}(t)$$

The resolvability test statistic for comparison purposes can then be calculated as the difference between $N_t$ and t. This difference represents the extent to which actual t is in error from an integer. If the resolvability test statistic exceeds a resolvability threshold ($T_r$), the ambiguity is deemed non-resolvable. If the ambiguity is resolvable, $N_t$ becomes the solution for solution-based resolution.

Figure 5:
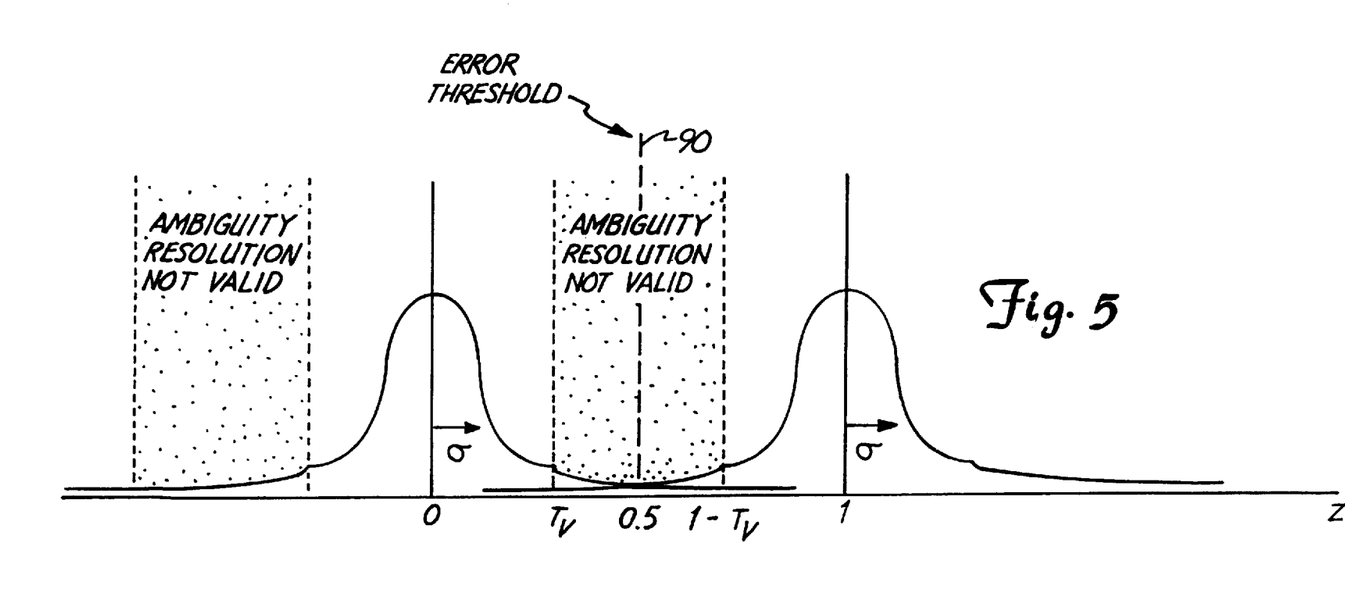
FIG. 5 is a plot showing fault detection availability according to an exemplary embodiment of the present invention.

FIG. 5 sets up the decision test for the validity of a solution-based ambiguity resolution. The signal may occur at an integer value (only 0 and 1 shown in this case) with equal probability and identical distribution. If noise in the 0-signal causes the resolvability test statistic to cross the 0.5 cycle threshold 90, it will be identified erroneously as a 1-signal.

By that decision criterion alone, the probability of error is the area under the 0-normal distribution curve outside of ±0.5:

$$p_\varepsilon = 1 - 2 \cdot P\left(z > \frac{0.5}{\sigma}\right)$$

However, if this error probability exceeds minimum integrity requirements (which can be set arbitrarily or calculated for high-integrity applications), we will need to trade off some availability for integrity. By setting up a resolvability threshold ($T_v$), that turns out to be symmetrical about +0.5 and −0.5, the probability of error becomes $$p_\varepsilon = 1 - 2 \cdot P\left(z > \frac{1 - T_v}{\sigma}\right), 0 < T_v \leq 0.5$$

and the probability of availability for the given σ is $$p_\varepsilon = 1 - 2 \cdot P\left(\frac{T_v}{\sigma} > z > \frac{1 - T_v}{\sigma}\right)$$

For an error threshold of $p_\varepsilon \leq 0.001$, the dependence of availability on the solution error standard deviation σ is summarized in the following table:

TABLE 3

| σ | $p_a$ |
| --- | --- |
| ≤0.15 | 100% |
| 0.20 | 91% |
| 0.25 | 52% |
| 0.30 | 3% |

EXAMPLES

A fault detection availability analysis was conducted by computer simulation. The Optimized 24 GPS Constellation was used. In this preliminary analysis, no satellite outage was assumed; all 24 satellites were considered operational. A 100 mask angle was assumed for the receiver tracking. The full simulation included observations 10 minutes apart at locations on a 14 by 8 grid (50 in latitude and 50 in longitude apart) roughly encasing the contiguous 48 states of the United States.

The false alert rate used here was the higher of the two given in Table 2, 6.67(10$^{-5}$). The miss detection rate is 0.001. The minimum error that must be detected is one cycle and it was also assumed that we will encounter only one failure at a time. The measurement residual noise was assumed to have a standard deviation of 0.063 cycle; this represents the carrier tracking noise and multipath from two receivers at two epochs.

Figure 6:
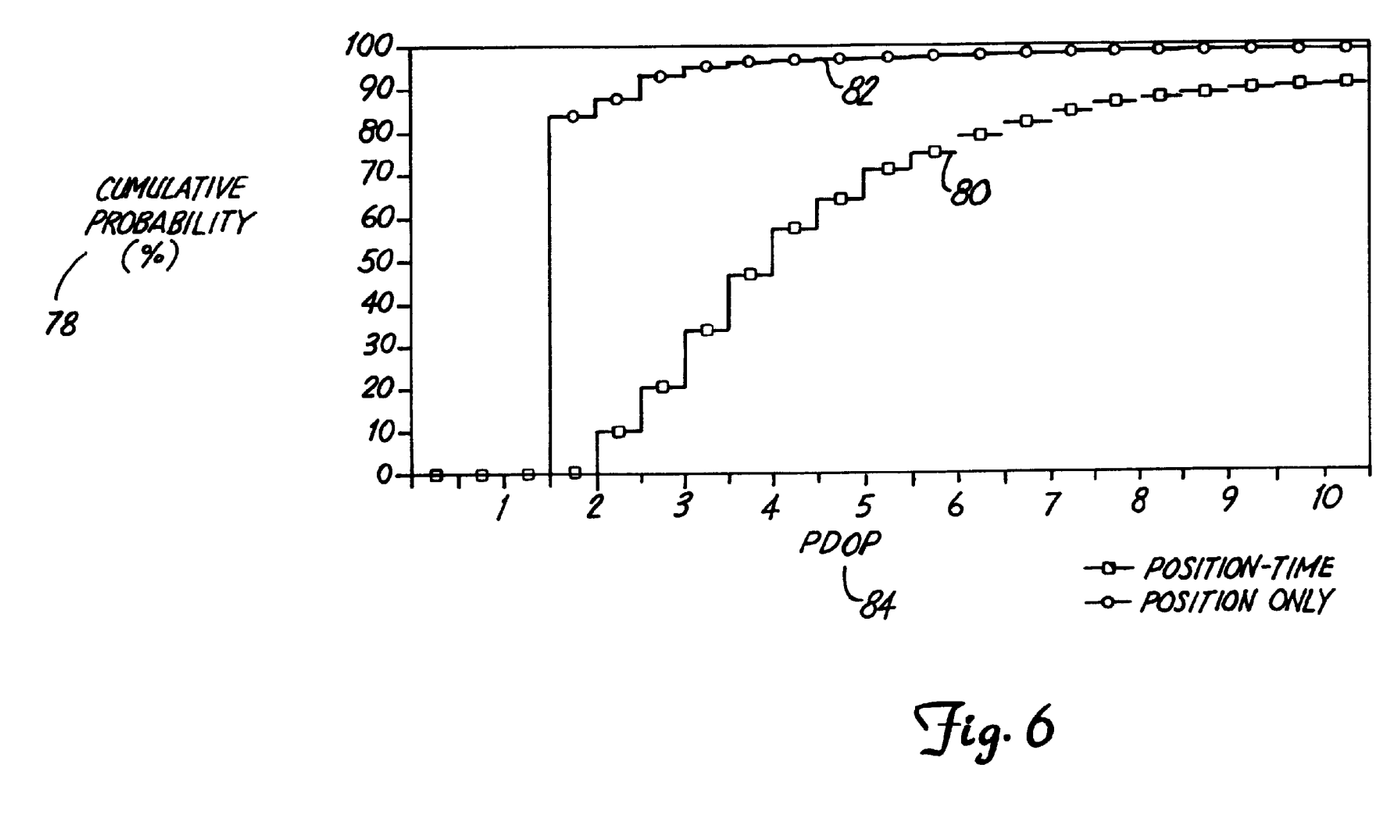
FIG. 6 is a decision test diagram for ambiguity resolution according to an exemplary embodiment of the present invention.

The plots in FIG. 6 show the cumulative probability of PDOP 78 for two cases. One is the position-time model 80 and the other is the position-only model 82. For any given PDOP threshold 84, it is clear that the position-only case is available with higher probability than the position-time case. From the overall results of the simulation, it may be inferred that the availability of the position-only case appears to be slightly better than 98%. The acceptable PDOP threshold depends on the specific system configuration. PDOP affects the relative position accuracy between antennas in a multi-antenna system but the separation between antennas also plays a part in determining the angular accuracy.

The cycle slip exclusion method was evaluated with the same availability simulation scenarios used previously for fault detection. The allowable misidentification probability threshold was set at 0.001. In the simulation, for each observer location (there are 84 in total) and at each time point (144 in total), a single cycle fault was introduced to each visible satellite in turn. In each case, the fault detection and exclusion performance was evaluated. Table 4 summarizes the statistics from the simulation test runs, once again for the two configurations evaluated before: position-time solution (4 satellites minimum), and position-only solution (3 satellites minimum).

TABLE 4

Statistics Of Fault Detection and Exclusion Tests

| | Statistical Probability of | | |
| --- | --- | --- | --- |
| System Model | Error in Fault Detection | Non-availability in Fault Exclusion | Mis-Identification in Fault Exclusion |
| Position-time | 0.00019 | 0.053 | 0.0011 |
| Position-only | 0.00013 | 0.0043 | 0.0018 |

The statistics for both cases show equivalent numbers for the error rate in the fault detection as well as the error rate (mis-identification) in fault exclusion situations. These error rates are determined by the thresholds established by prerequisite levels. The fault detection error is almost ten times better than the 0.001 level the system was designed to meet. The non-availability statistics are decidedly different between the two cases, as would be expected, since they are determined by satellite geometry. The availability of fault exclusion for the position-only case is an order of magnitude better than the position-time case.

Figure 7:
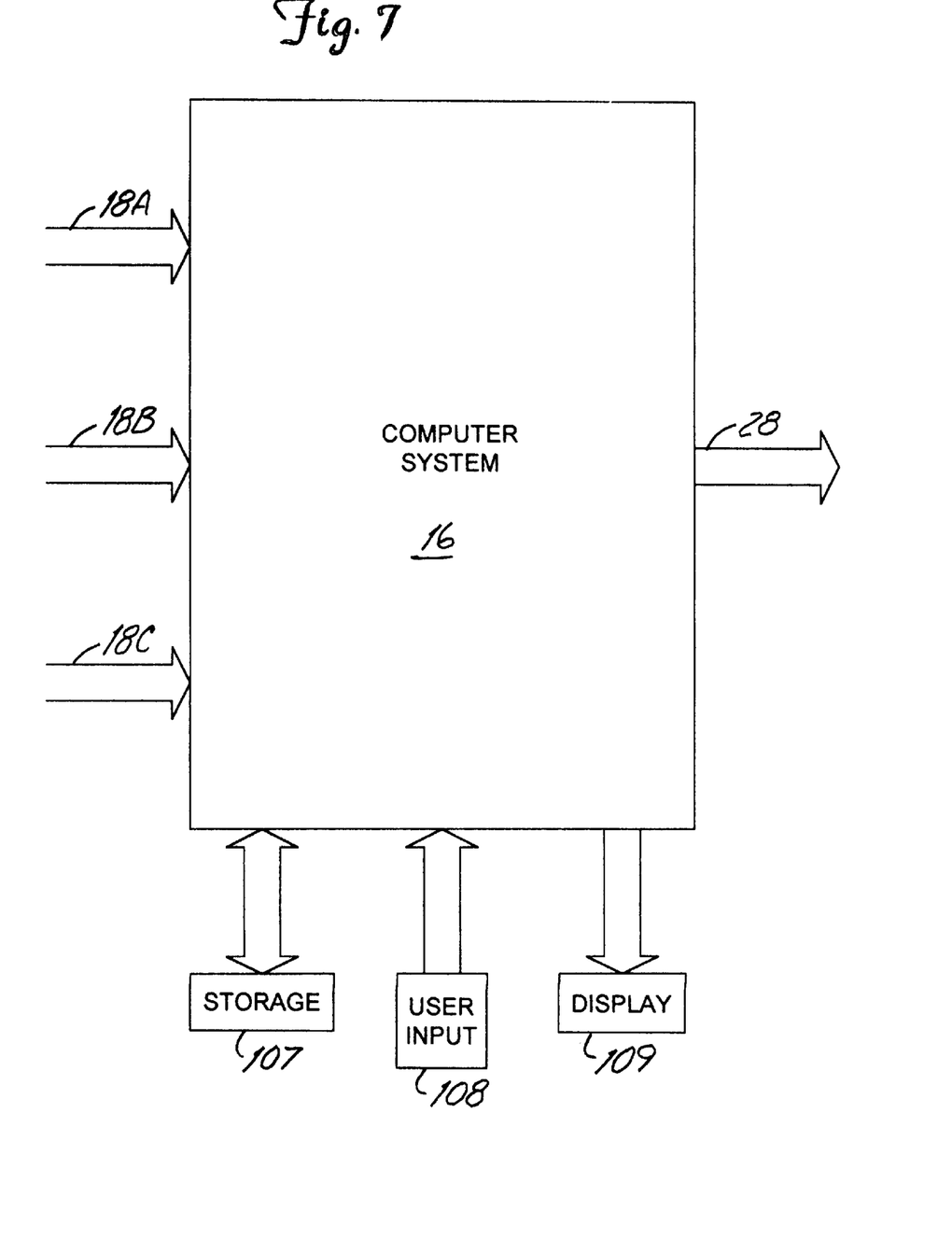
FIG. 7 is a block diagram of a computer system for executing the operations of FIGS. 3, 4 and 6.

The operations described herein, including those described with reference to FIGS. 3, 4 and 6 can be implemented in software on a computer platform. The computer platform can be a computer system 10 as shown in FIG. 7. Computer system 10 is preferably an Advanced Architecture Micro-Processor (AAMP5) manufactured by Rockwell, International, the operation of which is well known in the art. Alternatively, other types of computer systems can be utilized, including x86 based processing systems. Computer system 10 is coupled to storage device 107 for storing programs to execute the operations described with reference to FIGS. 3, 4 and 6, and is preferably a flash memory of 512k×16. Computer system 10 is also coupled to a user input 108, preferably a standard personal computer (PC) keyboard. Computer system 10 is also coupled to a display 109 for reporting data to a user, which can be any of a number of conventional displays including a cathode ray tube (CRT), monitor, LCD display or other.

Although the foregoing description has been provided for the presently preferred embodiment of the invention, the invention is not intended to be limited to any particular arrangement, but is defined by the appended claims. These and other alternative configurations of the invention, that may occur to those skilled in the art, are intended to form a part of the invention to the extent such alternatives fall within the scope of the appended claims.

What is claimed is:

1. In an attitude determination system having a plurality of satellites and having first and second antennas, a method of detecting and correcting cycle slip in said system comprising:

at a first processing epoch,
measuring a first phase of a first carrier signal at said first antenna from a first satellite,
measuring a second phase of said first carrier signal at said second antenna from said first satellite, and establishing a first single difference from said first and second phases;
at a second processing epoch,
measuring a third phase of said first carrier signal at said first antenna from said first satellite,
measuring a fourth phase of said first carrier signal at said second antenna from said first satellite, and
establishing a second single difference from said third and fourth phases;
establishing a delta single difference from said first and second single differences;
establishing a detection test statistic from said delta single differences;
establishing a failure detection threshold using a geometry of said plurality of satellites and a false alert rate;
comparing the detection test statistic to the failure detection threshold; and
declaring existence of a cycle slip based on said comparing further comprising:
at said first processing epoch,
measuring a first phase of a second carrier signal at said first antenna from a second satellite,
measuring a second phase of said second carrier signal at said second antenna from said second satellite; and
at said second processing epoch,
measuring a third phase of said second carrier signal at said first antenna from said second satellite,
measuring a fourth phase of said second carrier signal at said second antenna from said second satellite,
wherein said establishing a first single difference is established from said first and second phases of said first carrier signal and said first and second phases of said second carrier signal, and
wherein said establishing a second single difference is established from said third and fourth phases of said first carrier signal and said third and fourth phases of said second carrier signal.

2. The method of claim 1, further comprising determining which of said first or second satellites is associated with the cycle slip.

3. The method of claim 2, further comprising:
if said first or second satellite associated with the cycle slip is found, tagging the satellite associated with the cycle slip for post-exclusion; and
if said first or second satellite associated with the cycle slip is not found, tagging both said first and second satellites for post-exclusion.

4. The method of claim 3, further comprising reporting all satellites tagged for post-exclusion.

5. In an attitude determination system having first and second antennas, each antenna receiving a plurality of carrier signals from a plurality of respective satellites, a method for detecting and correcting cycle slip in said system comprising:
testing the detectability of said plurality of satellites wherein said testing comprises:
establishing a detectability threshold using a geometry of said plurality of satellites,
establishing a detectability test statistic,
comparing said detectability test statistic to said detectability threshold to determine which of said plurality of satellites are detectable and which are non-detectable, and
tagging each of said non-detectable satellites for pre-exclusion based on said comparing wherein said at least one of said plurality of satellites has an unresolved integer ambiguity and wherein at least three of said satellites have resolved integer ambiguities, further comprising the step of testing the resolvability of said at least one of said plurality of satellites and,
wherein said testing the resolvability comprises:
calculating a resolvability test statistic for said at least one of said plurality of satellites;
establishing a minimum integrity requirement;
establishing a resolvability threshold based on said minimum integrity requirement;
comparing the resolvability test statistic with the resolvability threshold;
declaring the unresolved integer ambiguity of said at least one of said plurality of satellites resolvable based on said comparing.

6. The method of claim 5, further comprising resolving the unresolved integer ambiguity only if the integer ambiguity is resolvable.

7. In a carrier phase-related system having first and second antennas for receiving a plurality of carrier signals, one from each of a plurality of satellites, wherein at least one of said plurality of satellites has an unresolved integer ambiguity and wherein at least three of said satellites have resolved integer ambiguities, a method for detecting and correcting cycle slip in said system comprising:
testing the resolvability of said at least one of said plurality of satellites, comprising:
calculating a resolvability test statistic for said at least one of said plurality of satellites;
establishing a minimum integrity requirement;
establishing a resolvability threshold based on said minimum integrity requirement;
comparing the resolvability test statistic with the resolvability threshold;
declaring the unresolved integer ambiguity of said at least one of said plurality of satellites resolvable based on said comparing.

8. The method of claim 7, further comprising resolving the unresolved integer ambiguity only if the integer ambiguity is resolvable.

9. An apparatus for detecting and correcting cycle slip in a GPS attitude determination system having a plurality of satellites, comprising:
means for establishing detectability criteria;
means for testing the detectability of said plurality of satellites using said detectability criteria to establish non-detectable satellites;
means for tagging non-detectable satellites for pre-exclusion;
means for establishing resolvability criteria;
means for testing resolvability of ambiguities associated with satellites tagged for pre-exclusion and post-exclusion to establish resolvable satellites;
means for resolving ambiguities associated with satellites tagged for pre-exclusion and post-exclusion only if they are resolvable based on said testing.

* * * * *